US008340291B2

(12) United States Patent
Wanderley

(10) Patent No.: US 8,340,291 B2
(45) Date of Patent: Dec. 25, 2012

(54) SYSTEMS AND PROCESSES OF AUTOMATIC VERIFICATION AND PROTECTION OF PAPER DOCUMENTS AGAINST FALSIFICATION, ADULTERATION AND LEAKAGE

(76) Inventor: Luiz Alberto Wanderley, Rio de Janeiro (BR)

( * ) Notice: Subject to any disclaimer, the term of this patent is extended or adjusted under 35 U.S.C. 154(b) by 167 days.

(21) Appl. No.: 12/610,998

(22) Filed: Nov. 2, 2009

(65) Prior Publication Data

US 2010/0111301 A1    May 6, 2010

Related U.S. Application Data

(60) Provisional application No. 61/110,795, filed on Nov. 3, 2008.

(51) Int. Cl.
*H04N 1/44* (2006.01)
(52) U.S. Cl. ....... 380/243; 358/1.15; 358/3.28; 358/400
(58) Field of Classification Search ............... 380/243; 358/1.15, 3.28, 400
See application file for complete search history.

(56) References Cited

U.S. PATENT DOCUMENTS

| | | | |
|---|---|---|---|
| 2003/0039195 | A1 | 2/2003 | Long et al. |
| 2004/0223645 | A1 | 11/2004 | Cliff |
| 2005/0034069 | A1 | 2/2005 | Carlson et al. |
| 2006/0213993 | A1* | 9/2006 | Tomita .................. 235/454 |
| 2007/0110235 | A1 | 5/2007 | Pruitt et al. |
| 2008/0101606 | A1* | 5/2008 | Silverbrook et al. ........ 380/243 |

OTHER PUBLICATIONS

International Searching Authority, "Notification of Transmittal of the International Search Report and the Written Opinion of the International Searching Authority, or the Declaration," Jul. 21, 2010.

\* cited by examiner

*Primary Examiner* — Kaveh Abrishamkar
*Assistant Examiner* — Ayoub Alata
(74) *Attorney, Agent, or Firm* — Holland & Hart LLP

(57) ABSTRACT

Protection of documents printed in paper is provided by processes for detection, immediately and clearly, of different types of falsification, adulteration, inclusion and omission. A network accessible system is capable of detecting several fraud aspects. A "Remote Expertise Center" or a remote service data center accessible from and to any location in which there is a connection to the network, such as through the Internet provides customized protection and automatic verification of document pages. Documents pages are generated by the Remote Expertise Center and transmitted to remote printers, bypassing user operational system, using a specific driver of each printer, avoiding any access to protected document before effective printing. Documents include multiple types of security features, such that in the event that any of them is surpassed, the document will remain protected by the other types of security protection. Security features may include, among others, background images, computer readable code containing the printed content, identification information readable only with a predetermined optical filter, a copy alert that changes appearance when the printed document is copied, and personalized items to identify individuals responsible for non authorized document disclosure or leakage.

21 Claims, 7 Drawing Sheets

FIG. 2

(iv) Responder, nos termos dos arts. 186, 187 e 927 do Novo Código Civil Brasileiro, independentemente de notificação judicial ou extra-judicial, por perdas e danos, pelo inadimplemento da obrigação de não divulgação dos documentos e informações confidenciais de que sejam ou venham a ser depositárias.

Que o presente compromisso é feito sob as penas dos Arts. 184 e seguintes da Lei de Patentes (Lei 9279 D.O. 15.05.1996), sem prejuízo das perdas e danos a serem apuradas nos termos dos Arts. 389 e 409 do Código Civil.

i. Ocorrendo violação de qualquer disposição do presente Contrato, incorrerá a parte infratora no pagamento de uma multa, compensatória, no valor equivalente a no máximo obrigação principal do valor da Proposta Comercial;

ii. As Partes retornarão no prazo máximo de 180 (cento e oitenta) dias, todos os originais, as cópias, reproduções e resumos das Informações ou Materiais Confidenciais quando a outra Parte solicitar ou, segundo critério exclusivo da outra Parte, certificando ou comprovando a destruição dos mesmos;

4A iii. As Partes reconhecem que compensações pecuniárias podem não ser uma indenização suficiente para reparar a divulgação não autorizada das Informações Confidenciais e que a Parte lesada será intitulada, sem abdicar de quaisquer outros direitos ou indenizações, a tal compensação injuntiva ou eqüitativa de acordo com o que possa ser considerado adequado por um fórum de jurisdição competente, reservando-se o direito de utilizar outras medidas e recursos cabíveis, seja através de obtenção de uma ordem judicial ou pelo exercício de quaisquer outros direitos conferidos por lei, conforme determinado pela autoridade competente, sem que isso implique em renúncia a nenhum outro direito ou medida.

Disposições Gerais:

(a) Todas as Informações e Materiais Confidenciais são e permanecerão de propriedade da parte que as revelou. Por revelar informações reciprocamente, as partes não concedem qualquer direito, explícito ou implícito sobre quaisquer patentes, direitos autorais, marcas comerciais ou informações de negócio sigilosas.

(b) O Contrato constitui o acordo completo entre as partes com relação a confidencialidade e reúne todas discussões prévias havidas entre eles sobre Informações Confidenciais. Este Contrato não será modificado exceto por um contrato escrito com data posterior à data do Contrato e assinado por ambas as partes. Nenhuma das provisões do Contrato será considerada como abandonada por qualquer ato ou anuência pelas partes, seus agentes, ou empregados, mas somente por um instrumento escrito assinado por um oficial autorizado das mesmas. Nenhuma renúncia a qualquer disposição deste Contrato constituirá uma renúncia a qualquer outra provisão ou à mesma provisão em outra ocasião.

(c) Se as Partes contratarem advogados para fazer valer quaisquer direitos que advenham de ou se relacionem com este Contrato, a parte vencedora será intitulada a receber da outra parte os honorários pagos a seus advogados, na base de 20%, quando judicial. Este Contrato será interpretado e regido pelas leis da República Federativa do Brasil.

(d) Este Contrato beneficiará e obrigará as partes, seus sucessores e cessionários, observadas as eventuais limitações previstas no mesmo.

SYSTEMS AND PROCESSES OF AUTOMATIC VERIFICATION AND PROTECTION OF PAPER DOCUMENTS AGAINST FALSIFICATION, ADULTERATION AND LEAKAGE

CROSS-REFERENCE TO RELATED APPLICATIONS

This application claims priority to U.S. Provisional Patent Application No. 61/110,795, filed on Nov. 3, 2008, entitled "PROCESSES AND SYSTEMS TO PROTECT DOCUMENTS BY PREVENTING ADULTERATION, COUNTERFEITING AND FRAUD," the disclosure of which is incorporated by herein in its entirety.

FIELD

The present disclosure is directed to document complete integrity, and, more specifically, to protection and verification of paper documents to prevent and indicate falsifications, adulterations, distinguishing original from copy and leakages of a document.

BRIEF BACKGROUND

Traditionally, there have been several different approaches to protect the complete integrity of documents, to protect both against falsification and/or adulteration and distinguish between original and copy. Normally authentication of document refers to origin of document, while complete integrity covers simultaneously aspects of origin (falsifications) adulteration (inclusion, exclusions and alteration of contents) and distinguishing original from copy. Such approaches include, for example, 1) sets of static security features pre-applied in industrial security printers on regular, or special, paper; 2) isolated dynamic features applied in regular paper; and 3) electronic security features protecting documents while in electronic format. Each of these approaches is described in turn.

Initially, with respect to static security features, various techniques for document protection are known, but which, alone or in combination, are not capable of covering the different types of fraud with respect to the protection of documents printed in standard paper. Traditional static security features include a set of technologies that warn against copies, such as through special backgrounds, micro printing, etc. However, such features are applied to paper using special industrial printers, restricting document generation to one or a few locations. This can lead to longer lead time to generate and deliver such documents, which can have negative consequences. Furthermore, such approaches have higher costs, as industrial specialized equipment is required. In addition, these technologies do not automatically indicate removal, alteration or inclusion of information and do not facilitate the identification of the person that may have leaked documents to non authorized persons.

As referred to herein, "Static Protection" shall be understood as the protection applied to paper prior to printing of a document. As such, there is no direct connection between the security information and information included when the document is printed, such as date, universal time, originator, user, contents, etc. This is in contrast "Dynamic Protection" and, as referred to herein, shall be understood as protection applied at the time of printing of text or other information contained in a page of a document and that changes from page to page or document to document. Dynamic protection carries information that changes dynamically in every printing, such as: date and universal time, originator, user, contents, etc.

With respect to dynamic features, traditionally isolated dynamic features may be applied in regular paper. Such dynamic features can be applied dynamically in usual paper. However, such security features are traditionally applied on stand alone basis and protect only one aspect of the range of chances of fraud. For example, each dynamic security feature may be applied to protect against one kind of fraud, but not protects against a set of fraud possibilities. Example: a technology that is visible with special lens in original and that disappears in a copy (portion of text or an image, may include a time/date, originator) covers origin fraud, but not if the content of document has been altered or not. However, traditionally these types of protection are discrete items and there is no integration of these technologies that enable their use simultaneously and at the moment of printing. That is, Each of the technologies developed covers only one aspect of potential fraud.

Finally, with respect to electronic security features protecting documents while in electronic format, such protection is restricted to documents in electronic form. When a document is printed, the electronic security feature no longer remains with the document. For example, a power of attorney stored in the computer of the Notary Public's Office can be protected, but once printed it may be copied and adulterated, without being detected by the electronic security feature of the electronic document where adulteration where performed, maximum information can be that something is different, but never exactly what has been altered.

In many situations, it is desirable to verify that a document for signature, for example, is the same document as previously agreed between two parties. Presently, there is no efficient guarantee that the document to be signed (in paper) is the same document that has been sent to the other party, i.e., that such document was not amended in any way, even a comma. Similar situations are present for documents presented as original, and even those notarized (such as powers of attorney, certificates, etc.), since the authentication provided in the Notary Public's Office includes, at most, the verification of origin, but does not cover the automatic verification of amendments to the text of the document.

Thus, a problem related to current day document security concerns the vulnerability of printed documents, especially those involving several interested parties, with various versions, until the moment of the respective signatures. Additionally, with advances in the technology of copier machines and scanners, the production of copies with excellent quality results in a difficult, if not sometimes impossible, task of distinguishing the original from a copy. This allows assembling of different contents than original one without clear perception of the other party.

Additionally, a further problem is the high cost involved when one (or various) specialized professionals are assigned to carry out personal verifications (through visual reading) of the printed documents, since such verification must be done 'page by page' 'character by character', comma by comma, with consequences in time, costs and risks arising from human visual checking. Changing a simple comma in any document can change rights and obligations between the parties. Moreover, it is well known that the human visual checking is not permanently sharp and accurate enough for this kind of verification, resulting in relatively frequent errors.

It can be added that there are various security technologies that make it possible to identify, with a high degree of certainty, whether a document is true or false. However, such technologies require an "expert" to make such a determination. In many transactions, time to reach such certainty may provide the defrauder time and opportunity to benefit from the fraud committed. In some cases is possible to indicate that document content has been altered, but not what was original text compared with now visual text, showing exactly where, in both text versions, adulterations occurred.

SUMMARY OF ASPECTS OF THE PRESENT DISCLOSURE

In light of the above described problems and unmet needs, processes and systems according to aspects of the current invention allow for the use of telecommunications technology and outside expertise during the printing process of documents, as well as during the verification phase by a document user of a protected document. The use of telecommunications, such as a network and/or the Internet, allows any document user worldwide to perform an instantaneous verification of a document's complete integrity at the time the document is presented to the user for consideration or execution, for example. Thus, any origin problem and alteration on the document may be detected immediately and before execution, as opposed to some time after the document has been executed and has possibly already been used in a fraudulent manner.

The present disclosure provides systems and methods for detection, immediately and clearly, of different types of falsification, adulteration, inclusion and omission. Aspects of the disclosure provide identification of fraud, by document page and location. In one embodiment, the present disclosure provides a network accessible system that is capable of detecting several fraud aspects. Such a system, in an embodiment, includes a "Remote Expertise Center" or a remote service data center accessible from and to any location in which there is a connection to the network, such as through the Internet. Verification may be done immediately with a high degree of precision to provide a conclusive determination of document complete integrity. Another aspect of the present disclosure provides multiple types of security protection. Such multiple types of protection provide additional security because, in the event that any of them is surpassed, the document will remain protected by the other types of security protection.

In one embodiment, a service is provided that provides automatic protection and verification of a document. Such protection is performed at the time of printing of a document and printed along with document content. A user may desire to verify the complete integrity of the protected document. Such a user may provide an image of the protected document to the "Remote Expertise Center" which can then verify the document has not been altered since the document was protected printed. The protection provided for a document aggregates and integrates several technologies to provide an integrated and differentiated barriers applied to the process of protection of documents. If one type of security feature is broken, other security features will likely persist and enable the detection of frauds. Such a service provides efficient processes, in order to facilitate protection, automatic checking, and decentralized control, that is significantly less expensive and less time consuming than traditional document protection schemes. This allows also that organizations can offer new customer services and market through new business processes.

According to various aspects of the current invention, and in order for document protection to be optimal and to avoid fraud that subverts legal rights and obligations, it is advantageous that a lay document user be able to distinguish between an original and a copy, even a copy of excellent quality.

According to various aspects of the current invention, the storage of an encoded text largely invisible on the user's printed document itself is disclosed. The encoded text may be decoded by remote decoding software to allow a comparison of the original text encoded on the page to the actual visible text printed on the hard copy of the user's document. Comparison is remotely performed automatically comparing the decoded text with text visual portion of the page and displayed on a user's computer screen. It should be noted that in this embodiment the decoding of the encoded text is performed remotely at a central server equipped with decoding software. Accordingly, the user may be located remotely from the central server and may communicate with the central server via a network such as, for example, the Internet. According to various aspects of the current invention, the original document may be recovered via scanning of the encoded text, the scan is transmitted to the central server, and the decoding software will decode the scanned encoded text, and the result comparing original and visible content will be transmitted back to the user to be displayed on a computer screen accessible to the user.

According to various aspects of the current invention, a remote server may receive the scanned encoded text from a printed document via, for example, a network such as the internet. Accordingly, the remote server may be used to prevent fraud by allowing a user to compare visual content of a hard copy of the document and the decoded version of the encoded text printed on the same document. According to various aspects of the current invention, the encoded text may be stored on the hard copy in the form of a security bar, or other printed pattern that can only be read via scanner and decoded by Remote Expertise Center. Thus, an immediate comparison can be performed by the Remote Server to determine whether the document is counterfeited or altered. As part of the process the encoded text, which is a representation of the document itself, may be decrypted by Remote Server to execute comparisons and sent back to be displayed on a computer screen of the document user. Cryptography may also be used in the transmissions between computer user and Remote Server. According to various aspects of the current invention, the remote server may be a dedicated server in a Remote Expertise Center. Once the encoded text is received by the remote server, the text may be decoded and compared with visible text portion and result will be transmitted back to the user. According to various aspects of the current invention, after comparison result between both text versions is transmitted back to the user, the entire verified page is immediately deleted from the remote server.

Accordingly, various aspects of the current invention provide for document verification and protection, in a decentralized manner, i.e., by allowing a document user to determine the complete integrity of a document in real time by accessing a remote server. Most commercial, industrial, financial, fiscal and like activities are generally based on contracts, certificates, powers of attorney, and similar documents that memorialize agreements between various parties and allocate the rights of the various parties. For example, a party to a contract may use various aspects of the current invention to determine whether a document is not a forgery before executing the document. According to various aspects of the current invention, processes are disclosed that enable an immediate verification of the complete integrity of a document by a remotely located lay document user or party to a contract, and that is effective before for example, execution of the document.

Also, several security features may be incorporated simultaneously on a document in order to improve the complete integrity protection of a document.

In some embodiments, document security is preserved after generation in the Remote Expertise Center and before the user prints the protected document through combination of electronic security features, as user certification, digital signature and software drivers for specific printer model. These electronic security features maintain integrity of document pages for the protected document by preventing access to a page before printing.

It is to be understood that the foregoing is a brief description of various aspects of various exemplary embodiments. It is therefore also to be understood that the scope of the invention is to be determined by the claims as issued and not by whether given subject matter includes any or all such aspects, features, or advantages or addresses any or all of the issues noted in the Brief Summary or Background above.

In addition, there are other advantages and varying novel features and aspects of differing embodiments. The foregoing and other features and advantages will become more apparent from the following detailed description, which proceeds with reference to the accompanying figures.

BRIEF DESCRIPTION OF THE DRAWINGS

Several embodiments including the preferred embodiments and currently known best mode of the present invention are shown in the following description and accompanying drawings in which:

FIG. 2 is an image of a verified document, split in original text portion and actual visible text portion, with highlights indicating alterations in each portion for an embodiment of the present disclosure. This image illustrates the document's automatic adulteration verification process, having a screen that is split into two parts: the first one corresponding to the original document text stored in the Security Bar at the time of the document printing, that resides in the encrypted area (see FIG. 3D). The second part reflects the text contained in the visible document text (3B). If there is some discrepancy between the two parts (adulteration), the system detects and indicates each discrepancy with a colored marker (2C). This layout, in an embodiment, is also printed as a receipt and sent to Customer server for blocked file auditing purposes

FIG. 4 is an image of a copy of a printed document having a plurality of security features of the embodiment of FIG. 3. This image illustrates a page copied from the protected original document. The Special Background disappeared or became faded out (4A). On the identification area (dark black), whose contents can be read only through the use of a special lens on the original protected document, the reading in the copy is no longer possible (4B). The copy alert against copy is now showing the word "COPIA" twice (4C). The encrypted and coded text area (4D) may be maintained or becomes useless, depending on the capabilities of equipment used for the copy.

DETAILED DESCRIPTION

Figure 1:
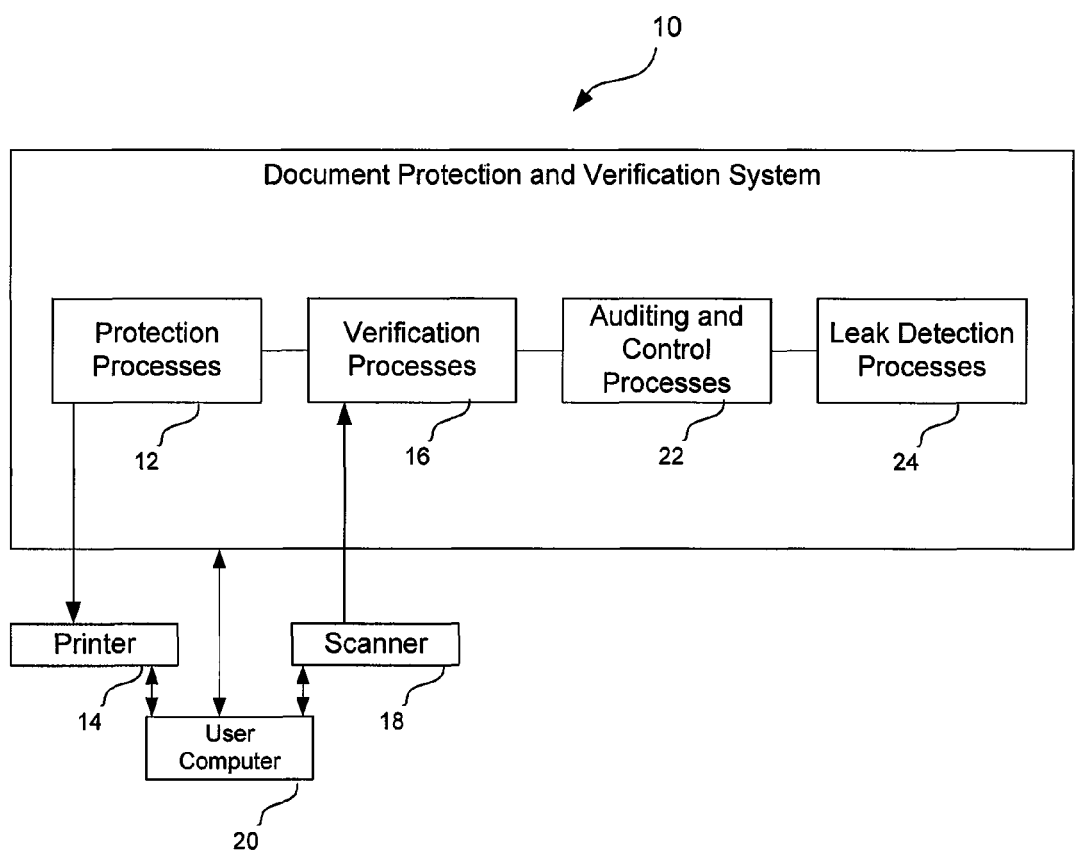
FIG. 1 is a block diagram illustration of a system of an exemplary embodiment of the present disclosure.

The present disclosure recognizes that currently there is no service, process or set of software in the market that encompasses a sufficiently robust set of functionalities and security technologies to obtain a high level of security and protection against document frauds. Such frauds may be inclusion, alteration or removal of a portion of a document, changing a portion of a document, falsifications, creating copies of a document, etc. The present disclosure also recognizes that it would be desirable to provide for the detection, along with an indication in the document identifying, originator, date, universal hour, alterations, inclusions, and elimination of any document content.

As discussed above, usage of discrete single technologies allows dynamic security to be applied to a document. However, as also discussed above, such technologies are stand alone features that apply to protect against one aspect of fraud of a document. Such technologies therefore have shortfalls with respect to other protection aspects of documents that are left relatively vulnerable to several fraud possibilities.

The present disclosure provides new processes for protection, verification and control that are integrated into a platform. The platform can apply differing security features, in predetermined sequences, such that any type of fraud in a document may be identified. In one embodiment, a Remote Expertise Center can be accessed, such as through the Internet, by a certified user that may desire to execute a high security job. This Remote Expertise Center may be accessed by the user, who provides the document content and receives a document that may then be printed which contains a plurality of security features. At a later time, the user, or another user, may access the Remote Expertise Center and determine if the document is original, had been altered, copied, or otherwise changed. The combination of the new security features, integrated in an automatic process of verification, makes it possible for the user to be sure about originator, universal hour, distinguish an original document from a copy, and to identify exactly which and where adulterations were done, showing simultaneously original text and actual visual text and discrepancies between both.

In one embodiment, a secure document is provided that includes a plurality of security features. One of the security features is the storage of the text in codified, encrypted form on each document page. The encrypted codified text is printed in a computer readable format in, for example, a margin of the printed document page. When the complete integrity of the document is to be verified, the document page may be scanned and provided to a computer Server in Remote Expertise Center containing program code for decrypting and decoding the text. This decrypted and decoded text may then be compared to the text in the body of the page to identify any differences. In one embodiment, the decoding software is executed by a Server computer at the Remote Expertise Center that receives a scanned image of the whole page of document encrypted via a network connection, such as through the Internet. In one embodiment, the decrypting and decoding text in Server computer, with many internal processors, also includes a second portion of transmitted page, meaning Optical Character Recognition (OCR) that may convert image of visual text in corresponding printed text. The decrypting and decoding processing in this embodiment generates a first document recovery by decoding and decrypting the information in the security feature. A second document recovery is then generated by performing OCR on the visual text image converting it into printed text corresponding on the document page. The first and second document recoveries are then compared to identify any differences that would indicate that the document has been altered. In an embodiment, a scanned image of the document page is transmitted, such as via the Internet, to the Remote Expertise Center that then performs the processing required for the comparison. As will be understood, reliable decoding and decryption of the security feature, as well as reliable OCR, require that the document be printed and scanned using equipment capable of minimum printing and scanning quality so as to provide reliable comparisons, enhanced tuning between printer and scanner and between scanner and OCR is a must to achieve 100% conversion, where only and exactly which adulterations will be shown as result of comparisons. In an embodiment, a complete system is provided to a user, including a printer, scanner, and network interface (such as software executing at a user computer) to interconnect to the Remote Expertise Center. In other embodiments, software executing at the Remote Expertise Center computer performs the decoding, decryption, OCR, and comparisons. Intelligence of all protection and verification processes are resident solely in Servers of Remote Expertise Centers, avoiding any chance that one user with high expertise can try any alteration to obtain a document similar of another customer. In another embodiment documents include a security feature that provides information related to leaking of information on confidential document pages to non-authorized individuals. These and other embodiments and security features will be described in greater detail below, with reference to the drawing figures.

Process Activities

With reference first to FIG. 1, a high level block diagram illustrates functional processes of a system of an embodiment of the disclosure. In this embodiment, a document protection and verification system 10 comprises a number of process activities. First, protection process 12 include processes for the production of documents printed with the protection of a plurality of security features, such as special backgrounds and a security bar comprising several security features in a margin of a page of a document. Security features that are used in various embodiments are described in more detail below. Protection processes generate the security features and a document printed at printer 14 may include the content of the document, along with the security features that were generated for the document.

Verification Processes 16 are used in verifying that a document has not been altered, that complete integrity remains. Verification processes 16 are automatic verification processes that will be described in greater detail in a moment. However, it is pointed out that non-automated verification processes may be employed that include visual verification of a document. In many cases, visual verification will precede the automatic verification and may be performed by anyone that visually observes the document. Visual verification may include visual review of visual security features such as background images or watermarks. In some embodiments, a different visual security feature may be applied to a document based on the user logos or marks that generated the document content. Such visual features may also include information related to when a document was created. Considering Remote Expertise Centers can be installed in several continents an universal time will be applied to clarify any precedence of rights due to time register. In addition, the background may be printed so as to be completely visible in the original, but invisible (or faded) in a copy. Visual verification may be performed without charge and can be performed by anyone.

Automatic verification using verification processes 16 are performed with a certified user of the system 10 submits a document to be verified. Such a document may be submitted by scanning the document to a specific scanner 18, with the scanned image transmitted to the verification processes 16 of the system 10. It will be readily understood that scanner 18, and printer 14, may be connected to the system 10 directly, through a local area network such as a LAN, through a wide area network such as the Internet, or through a wireless network, or any combination thereof. Furthermore, information may be transmitted through any of a number of different communications protocols, such as TCP/IP, for example, Additionally, printer 14 and scanner 18 may directly transmit information to the system 10, or may transmit information through one or more intermediary computers, such as a local user computer 20 that can communicate with the system 10.

In any event, the scanned image of the document to be verified is transmitted to the verification processes 16 by Remote Expertise Center, which perform the verification process automatically by, for example, reverting the encryption and decoding the document stored in the security bar in embodiments employing such a security feature. The verification processes 16 perform a comparison between the original text document as determined, for example, by decryption and decoding of information contained in the security bar, and the actual image of the document converted into text by the OCR. This comparison detects and indicates, automatically, the adulterations, which and where in the page, found in each page of the document, resulting page contents comparison, are sent back to be displayed in the screen of the certified user's computer. Moreover, in an embodiment, the system 10 Remote Expertise Center sends a voucher copy to the certified user's printer 14 to attest that the verification of the page of document was executed, and page result indicating each adulteration detected is input into a client record for future audit.

Figure 2:
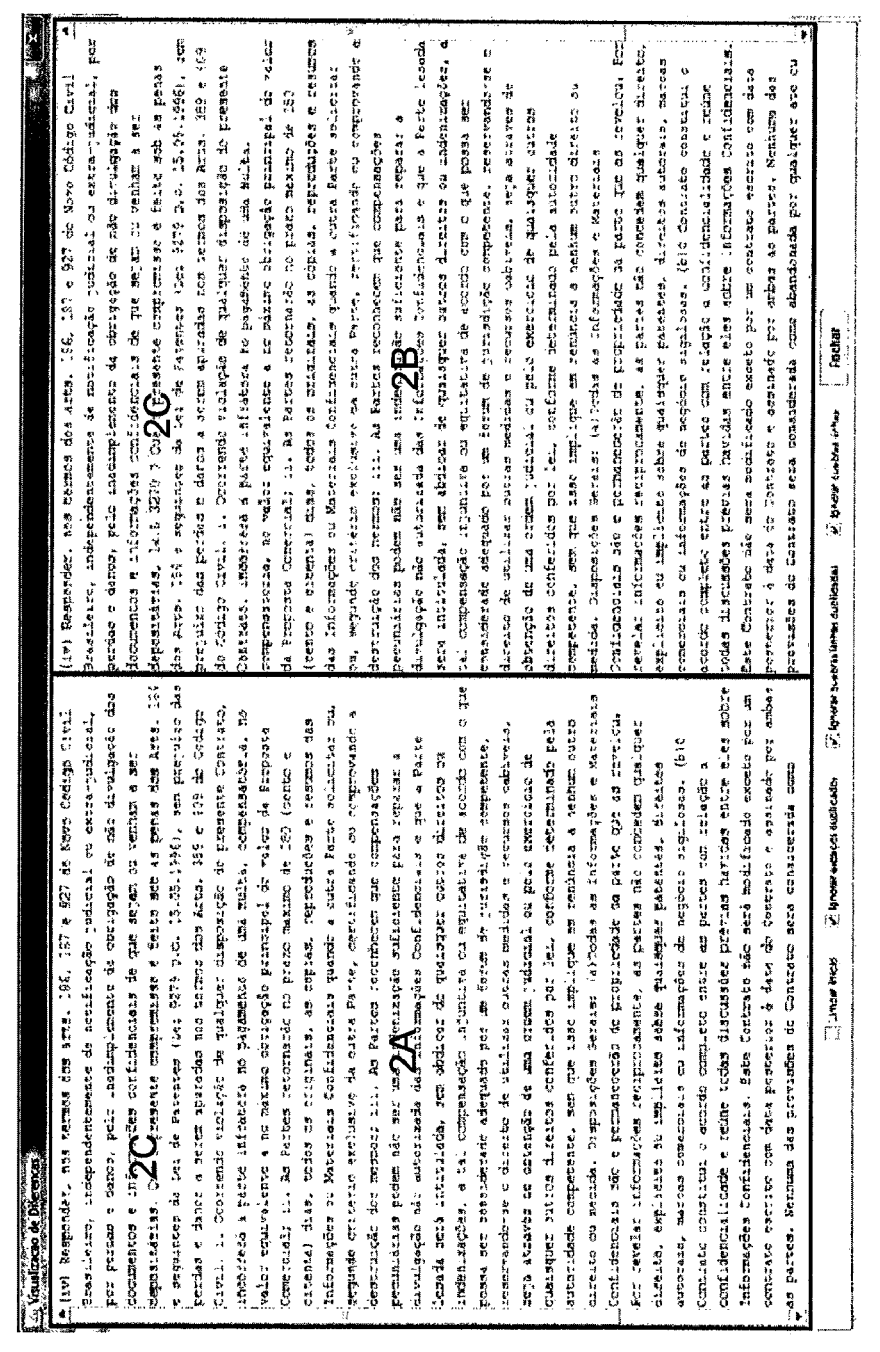

Referring to FIG. 2, a display of an automatic verification result is illustrated for an embodiment. In this embodiment, the screen displays two sections. The first section (2A) corresponds to the original document text stored in the security feature at the time the protection processes were performed on the document. The second section (2B) reflects the text contained in the visible document text. If there is some discrepancy between the two parts (adulteration), the system detects and indicates exactly each part with a colored marker (2C), being only a comma, alphanumeric character, word or sentence. This layout, in certain embodiments, is also printed as a receipt and may be saved into a customer record for blocked file auditing purposes.

It should be noted that, at this stage, that certain embodiments provide for the standardization of equipment for printing and digitalization, and the fine tuning of such equipment with the OCR software in the verification processes 16. Using standardized and compatible equipment, with the particular purpose of comparing texts, enables a high-performance in verification. In one embodiment, the printer 14 is color printer with a minimum of 1200 dpi, the scanner 16 is a color scanner with a minimum of 1200 dpi, and, in some embodiments, with the OCR tuning achieves unthinkable conversion of 100%. In several embodiments, image-text conversion may be repeatedly performed with very high reliability. It is well known that producing texts in any kind of printer and reading in any kind of scanner commonly results in image-text conversion that leaves parts to be corrected manually. By utilizing enhanced tuning, higher resolution components and an enhanced OCR routine, the processes of this embodiment make feasible new and by far more efficient services, decreasing costs, time and verification risks.

With continued reference to FIG. 1, the system 10 also includes Auditing and Control Processes 22. This process is performed both during the protection and verification processes, and for each transaction (page protected or verified) the auditing and control processes 22 generate a transaction log with a record of the document, date, universal hour, and certified user, taking into consideration each page protected or a verified through performing defined new processes. This record, in an embodiment, is transmitted to the user computer 20 for use in future auditing. In one embodiment, the system 10 maintains only information required for billing purposes, and the user computer maintains a complete set of information as the results of each page automatically verified, for example. This record, in an embodiment, is a read only file and cannot be removed or altered even if the user has access to the system through a special password or other control.

Finally, the system 10 includes leak detection processes 24. These processes address situations of vulnerability to leakage through several functionalities that may operate alone or in conjunction with other functionalities. Leakage, as referred to herein, refers to access to confidential information by an individual who does not have required authorization to have the information, or an individual that a user does not desire to have the information. One process used to control of the distribution of counterparts of the original document utilizes correlating synonyms ascribed and receivers, and hidden codifications that are kept in case of copies—which, read through the scanner, facilitates the decoding by the system 10, that also identifies the receiver responsible for the leakage. The leak detection processes 24 makes correlations between synonyms and key-words, as well as controls the final text sent to each receiver, and the correlations applied. For example to receiver A, one sentence will be written using the word "enhancement," which, for another receiver, will be "improvement." In this manner, for each receiver different sentences of document text will be altered, creating a data base of individualization of receivers based on altered words and different approximate numbers in specific sentences of document text.

Another process that may be used in leak detection processes 24 may be the application of the technology of the identification area, described above, that is applied to the document to be protected against leakage, such that the document can only be read with the use of a special lens. Consequently, the copies of documents are completely prevented, demanding a manual transcription which would consume much more time and may expose the person intending to commit the fraud. Another process provides, at the moment of printing of the document, that hidden codes are printed too, and, when copied, will generate the date and time of the copy and the serial number (equipment) that gave this command, adding these data automatically to the copy generated, providing means to discover who was the responsible for the leakage. For example, parts of sentences and different encoded backgrounds will be colored and combined with hidden instructions of Enlarged Reality, intended to produce different effect when reproduced. Another leak detection process is assigning each user a different background image that is printed on each user document, that stays in the copy enabling, thus, to identify the source of the leakage. Presently, there is an excess demand regarding the need to ensure that classified documents do not leak to third parties. This demand can be found in different segments, such as the judiciary (suits under way in camera proceeding); government executive (sensitive information that could affect the security of the country, or information that could, for example, favor parties of interest in tenders); as well as corporate (information that could unbalance competitors).

Service Access

The system is used according to various procedures. The procedures of use are: protection process and verification process. In one embodiment, the client or certified user has three ways of submitting documents for protection using the document protection and verification system. In this embodiment, the user computer 20 includes a client module that is used to initiate the protection process. Following the initiation of the process, in this embodiment, the system 10 performs remaining processes related to protection of a document. First, a digitally certified user can submit a document to be protected by selecting to print the document with protection trough the selection of a virtual printer shown in an available printer list. In this embodiment, from this point on, the processing is assumed by the system 10. At this point, the certified user who wishes to "print with protection", whose computer has generated the document, will go through a verification of his/her digital certification (inputted in his/her computer and checked by system) before each page of the document is transmitted to the system 10 for protection. In this process the protection will be implemented and the command "protected print" will be given, and document protected it will be transmitted back with digital signature to the certified user's assigned printer using set of instructions of specific model (printer driver), bypassing customer operational system.

A second method of submitting a document includes accessing system 10 directly (page protection submission in the site), through digital certification (inputted in the certified user's computer), that will be verified by system 10. The system 10 accesses the protection processes forwards the document to be protected. In this process the protection will be implemented and the command "protected print" will be given, and it will be transmitted back with digital signature to the certified user's assigned printer.

The third method, of this embodiment, of submitting a document entails sending an e-mail to the address specifically assigned by the system 10 to "document protection services" in connection with the company of record where the certified user works, with his/her digital certification, with the file to be protected attached to such e-mail. After sending of this e-mail, the procedures for document protection and protected print as above-cited will be in progress.

In other embodiments there are variants on each of the access possibilities above-mentioned, and the resulting use of system 10 processes. In one embodiment, in lieu of the user who submitted the document to the protection of the system 10, another user of record, from the same of from another organization, is able to print the document directly from his/her assigned printer. This user of record, and receiver of the document, mandatorily will have the password furnished by the generator of the documents, so that such receiver is able to access the system 10 and give the command to print—which will observe all the security procedures. This works to preclude direct printings from printers without prior authorization.

Regardless of the alternative used to access the system 10, the document to be protected is received as merely pages in the system which removes information related to the printed page just after processing. Accordingly, after processing nothing remains stored in the system 10, fully preserving page secrecy. In an embodiment a record is generated only for billing purposes. After encryption the protected page is directly sent to the assigned printer, without going through the operational system of the user's computer, using the called "driver" of each model of printer (specific set of instructions provided for each model by the vendor). Each page is simultaneously protected by digital signature when document is ready to be transmitted back to certified user, that will prevent the printing should any alteration be made to the page during time frame comprising transmission back to user and moment of effective printing. Access to protected documents is prevented before the printing, with a digital signature applied on the protected document page prior to being sent to the printing line, thereby avoiding a fraud possibility.

When it is desired to verify the authenticity of a document, a user may access the system 10 and perform the verification processes 16. In one embodiment, the client or certified user has three ways of submitting a document for verification. First, the user may select document verification from a client module executing on the user computer. Then, the user initiates a scan of the document using the assigned scanner 18. The system 10, at this point, assumes control and verifies the user's certification and, if OK, accepts the activation of the scanner to capture the complete image of the document. The system receives the image captured by the scanner and performs the verification processes for the document.

Another option for a user to submit a document for verification comprises accessing the system 10 (page verification submission in the site) using a digital certification inputted in the user computer. Upon confirmation, the system provides access to the verification processes, and the user computer sends the document to be checked. A third option for a user to submit a document for verification comprises sending an e-mail, with a digital certification and the document of interest attached, to an e-mail address specifically defined by the system 10 to the corporation or other organization to which the user belongs.

Visual Characterization of the Document

Protection and verification of documents as described herein are designed to be useable by a non "expert", i.e. a common laymen. The first part of the design provides a visual image that could identify a protected page of a document and could contain special background and special spaces in a "security bar" to cope with security technologies addressing protection, verification and control of the service.

Security Features and Functionalities

Figure 3:
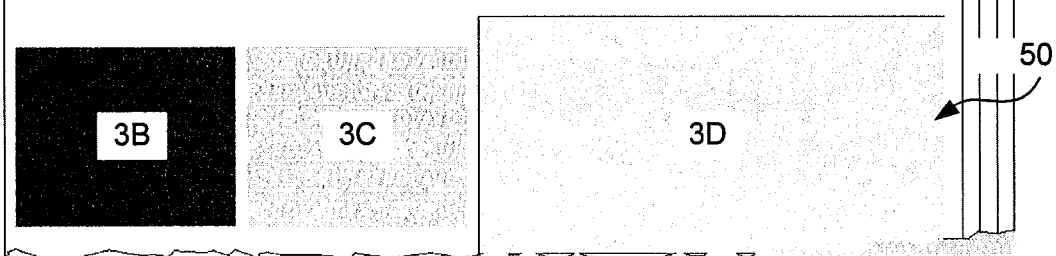
FIG. 3 is an image of a printed document having a plurality of security features of an embodiment of the present disclosure. This image illustrates an original page of the document, with the Special Background (3A), under the document text. On the Security Bar there is an identification area in dark black color, whose characters are visible only through a special lens (3B). Another area contains a feature copy alert (3C). The rightmost area contains the original document text, coded and encrypted (3D).

FIGS. 3 and 4 illustrate various security features that are used in various embodiments. As will be appreciated, the document protected page of the present disclosure cannot be copied or scanned without loosing one or more of the basic characteristics from the security features integrated on the service platform and fixed on the document page at the time of printing. However, the document continue protected, even if one or more than one of the security features is over passed. However, it is impossible to digitalize this page to put in this disclosure so as to describe all of the features. It is to be understood that the illustrations of FIGS. 3 and 4 are provided for purposes of illustration and discussion, and are not necessarily representative of an actual printed page according to the various aspects of this disclosure. One security feature that may be used in various embodiments is a special background, identified as 3A in FIG. 3. Underneath the content of the document each customer entity of the system shall have the possibility to develop a special background for its documents, such as, for example, a drawing composed of the logo of the company, a characteristic visual identification, etc. Regardless of the background chosen, whenever the original document is copied by any digital technology presently available, such background will disappear or become faded and this absence will cause the identification of the copy, as illustrated at 4A in FIG. 4.

Another security feature is the security bar 50 illustrated in the embodiment of FIG. 3. This feature is an area in the footer of the document page, covering all horizontal size of the page that was designed to give a typical visual image of a protected page document and will receive different areas for each technology or functionality that will integrate the system platform. Displayed within this security bar 50 are several features. An Identification Area (3B) includes controls related with the printing of the original document, visible with special lens only. The hidden information in this field is related to originality, such as certified user, universal hour, date, number of contract/document, and/or other information that may be important to settle any doubts regarding precedence of validity of rights, or version control. All of the information viewable using the special lens in this area disappear when copied, thus losing the information in this area, as illustrated in FIG. 4 at 4B. Copiers, scanners and digital cameras can not reproduce special hidden printed information that only can be read, in this embodiment, with a special lens. Such a special lens may employ any one of a number of optical techniques in combination with the printed content to reveal hidden information, such as color filters, and in one embodiment uses polarized light.

A copy alert 3C is a space where a word, such as "copy" or "void," (FIG. 4C) is emphasized when the protected document is copied. The final item in the security bar 50 of this embodiment is a codification of the text (3D). That is, the storing of the original text, in the original document itself (during the printing), in codified and encrypted form, only visible and identifiable by the system by using decoding and decryption algorithms. In one embodiment, government organizations may use special encryption, and/or special hash for its documents and have dedicated and double locked Remote Expertise Centers in their installations, but access to their Remote Expertise Centers only can be performed if simultaneously customer and the Remote Expertise Center unlock the physical access. When the document is scanned in, the system identifies the codified text, decodes the text, performs decryption on the decoded text, and provides the text of the page for comparison to the scanned text that is subjected to OCR. It will be understood that the security features in the security bar 50 may be arranged in any order, and that different, fewer, or more, security features may be included in the security bar 50. For example, in an embodiment, one of the spaces placed for the indication of the word COPY, can be replaced by technology that automatically indicates that a copied document is not only a copy or an original, but also indicates the originator of the document.

In addition to security features printed to the pages of a document, the present disclosure also provides digital security features. One such security feature may be a Digital Signature. This feature is used to alert alterations made between the moment of document page protection generation, and the time of printing of the document. Another such security feature may be a digital certification. This procedure prevents unauthorized users from generating or checking protected documents. The use of an individual and non-transferable digital certification to identify such user, in each page, is mandatory. This digital certification combined with the file that controls the authorized printers, assigns in which printers an user is allowed to receive protected documents.

Printers Drivers are also used to provide enhanced security for a document. The driver is software from the manufacturer of the equipment that works as a vehicle to conduct a document directly to a specific model of printer. The printer driver is used by the system to print the protected documents, without passing through the operational system of the user's computer. Since data about each printer and set of instructions specific of each model is known, a command, in this embodiment, is sent to a specific printer that will directly print the job. Because the print job is sent directly to the printer without passing through the operational system of the user's computer, it becomes very difficult to intercept documents already protected while they wait on the printing line of the respective assigned printer.

Embodiments also provide the capability of sending protected documents to printing by another user. In order to keep the high level of security in the protection of a document and enable other user(s) to print such a document directly, embodiments provide the ability to send a request to the system 10, by means of automatic process (via internet), to include the user in a protected server. Such a server will require a specific password at the moment of the access and will verify the digital certification of the user-receiver and the printer assigned to such user. The server will send the print job directly, using the driver of this model of printer, so that the document submitted to protection by one certified user can be safely printed with applied protection by another certified user.

Figure 5:
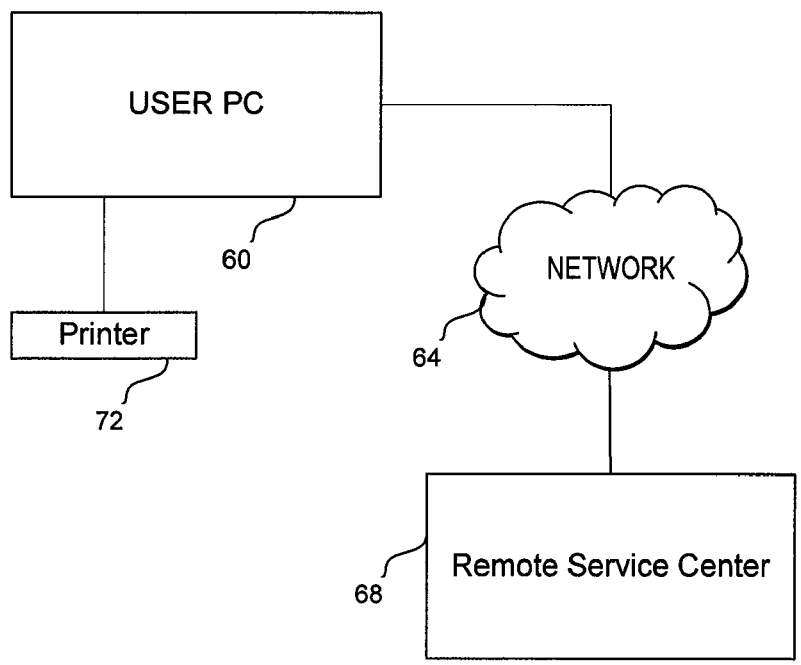
FIG. 5 is an illustration of a configuration of a user computer and a remote service center of an embodiment of the disclosure.

With reference now to FIG. 5, a block diagram of a system of an embodiment that provides security features to a document is described. In this embodiment, a user computer 60 is connected to a communications network 64, such as the Internet 64 and through the communications network 64 the user computer 60 can communicate with a remote service center 68. The user computer 60 is also connected to a printer 72 that may be used to print secure documents. The operational steps, for an embodiment, include, initially, the user interacting with the remote service center to get his "Digital Certification" approval. Next, the user clicks a protection service button on the user computer user interface using client software furnished for this purpose. The document is then sent to the remote service center and page by page encrypted. Each page follows a complete transaction and, in this embodiment, no record of its content will be retained at the remote service center. The remote service center, upon receipt of each page, (a) generates a record for transaction logging, (b) generate a special background on the page (e.g., FIG. 3), (c) generates the Security Bar with all areas composed by integrated technologies, (d) processes each protection technology and prepares the page for printing, (e) establishes a Digital Signature for the page protected prior to sending it to the print queue, (f) selects the printer in accordance with the digital certification record for the user, (g) sends the page to the print queue, and (h) prepares the log for this transaction and sends it to a customer server.

Figure 6:
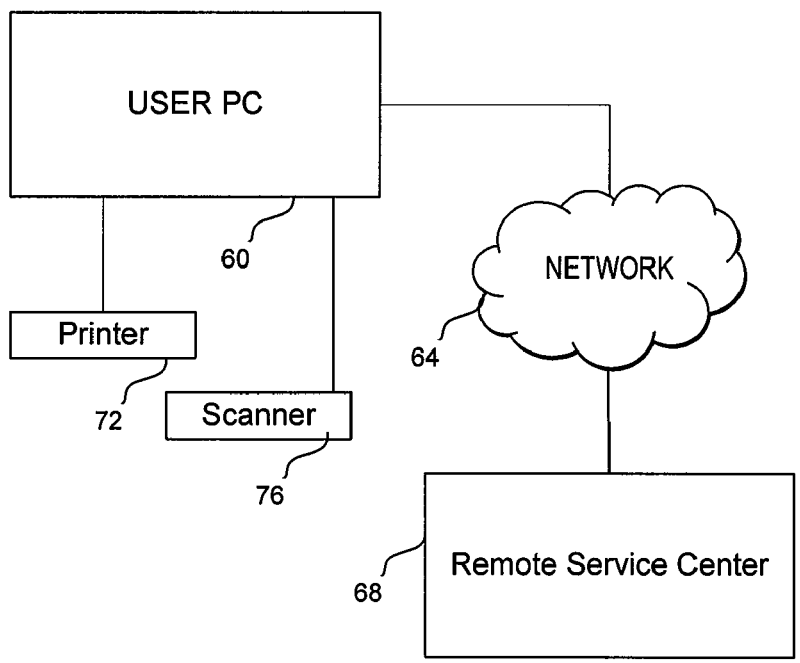
FIG. 6 is an illustration of a configuration of a user computer and a remote service center of another embodiment of the disclosure.

As discussed above, at some time after a protected document is printed, it may be desirable to verify the document has not been altered. With reference now to FIG. 6, a block diagram of a system of an embodiment that provides authentication of a document is described. In this embodiment, a user computer 60 is connected to a communications network 64, such as the Internet 64 and through the communications network 64 the user computer 60 can communicate with a remote service center 68. The user computer 60 is also connected to a printer 72 that may be used to print secure documents. The user computer 60 is also connected to a scanner 76 that may be used to scan images of a document to be verified.

The operational steps, for an embodiment, include, initially, the user interacting with the remote service center to get his "Digital Certification" conference approved. The user then clicks a verification service button on the user computer screen using client software that is used in the system. The document will be read by the scanner and sent to the remote service center page by page where each page is decrypted. Each page follows a complete transaction and no record of its content will be retained. Verification operations are then performed at the remote service center. The remote service center, in this embodiment, generates a record for transaction logging area, which may be used for billing purposes. The scanning reading, in this embodiment, follows this procedure: (a) the content of reading area "copy alert" is evaluated against the contents read by the scanner, (b) the comparison result will be a "Copy" or "no Copy" report along with information about the user that printed the document, date, time, etc. (c) the reading area, concerning page coded and encrypted and the page text content, are both read though scanning operation and OCR software is used to convert visual portion of document image in text and then Remote Server will compare to provide the following outcomes sent back to user(i) post to the PC screen showing both "versions" and all differences in each part, (ii) reporting for printing the screen content, (iii) reporting for auditing purposes with contents of screen, (iv) all reports are sent for the assigned printing queue, (v) all results of both comparisons copy alert and comparison of contents from Security Bar and text, will generate data for log purpose looking future auditing and send to Customer Server.

Figure 7:
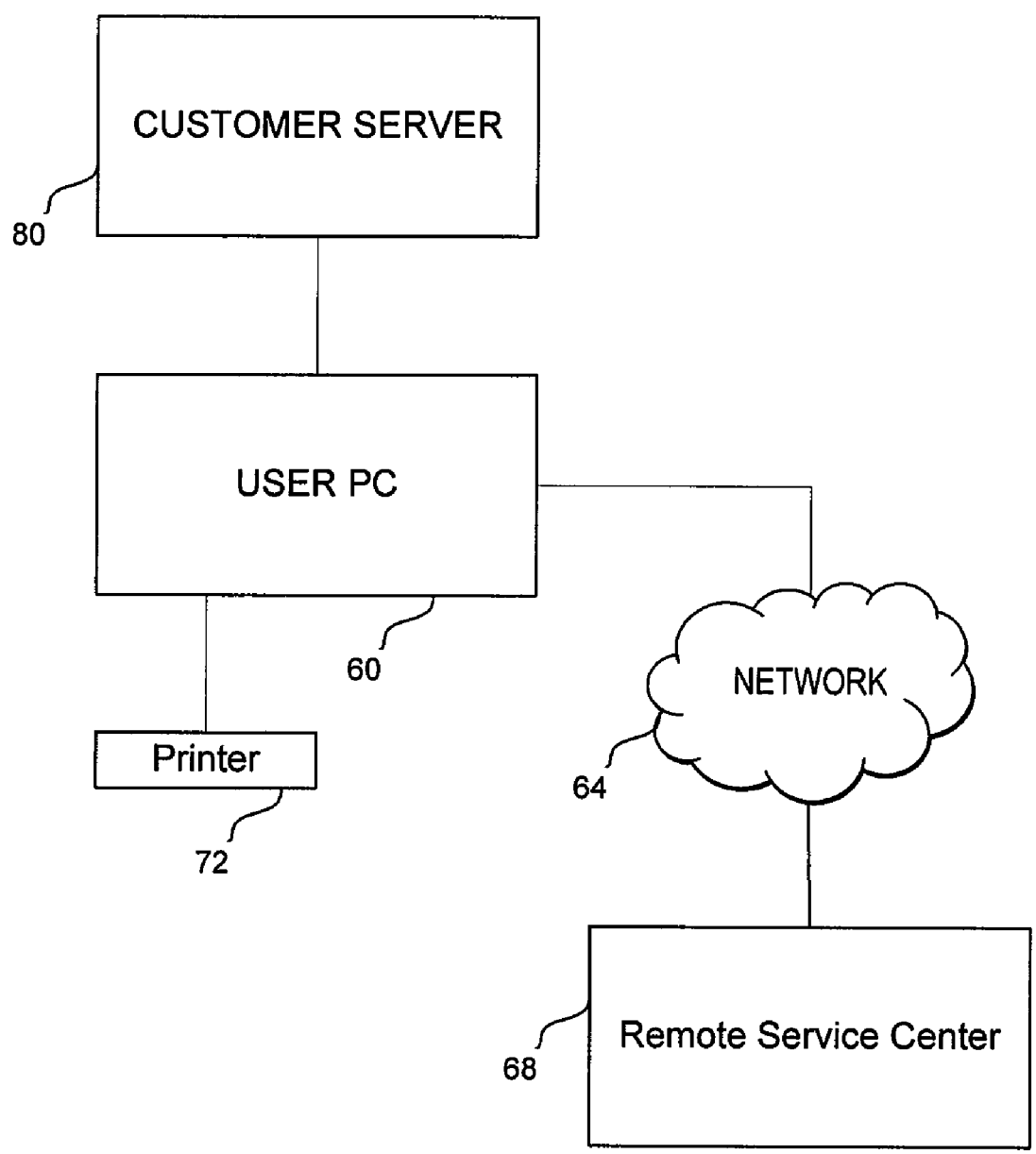
FIG. 7 is an illustration of a configuration of customer server, a user computer and a remote service center of an embodiment of the disclosure.

The control and audit process is described with reference to FIG. 7. As discussed above, at some time after a protected document is printed and/or verified, it may be desirable to audit results and evaluate the success to the system. FIG. 7 is a block diagram of a system of an embodiment that provides secure documents as described and a customer server that receives control and audit type provisions. In this embodiment, a user computer 60 is connected to a communications network 64, such as the Internet 64 and through the communications network 64 the user computer 60 can communicate with a remote service center 68. The user computer 60 is also connected to a printer 72 that may be used to print secure documents. The user computer 60 is also connected to a customer server 80. The operational steps, for an embodiment, include, after the protection or the verification is done, the server will; (1) Send to Customer Server the Transaction Log that will be recorded for future auditing, (2) the remote service center server has log information required for billing and eventual analysis of a defined transaction. (3) Customer will retain complete records (copy alert and comparison reports) of log transaction for auditing purposes that could be accessed by the remote service center if there is any issue about verification results. (4) These Customer records performed from each remote service center Server transaction sent to Customer Server will generate transaction data Bank that will be read only and cannot be removed or altered.

As can be readily understood from the above discussion, according to various aspects of the current invention, processes and systems provide for verification of a document. For example, once a document is about to be executed by a party to a contract who may be a party other than the party that has created the printed document, or third party, the third party can scan the printed document and transmit the scanned document to a remote server via a network such as, for example, the Internet. At the remote server, a verification of the document may be performed via a number of ways. According to various aspects of the current invention, one aspect of verification of the document is to decode the encrypted text on the security bar via a dedicated decoding.

Accordingly, once the security bar is decoded, the remote server may transmit to the third party an image of comparison result between original and visible portions of document. In one embodiment, remote server compares both the scan of the actual visual printed document and the image of the document decoded from the security bar, and will transmit the result of the comparison of the two portions of same page of document to the third party via a network such as the Internet. For example, the comparison may be in the form of a document highlighting differences between the scanned printed document and the decoded document.

Figure 8:
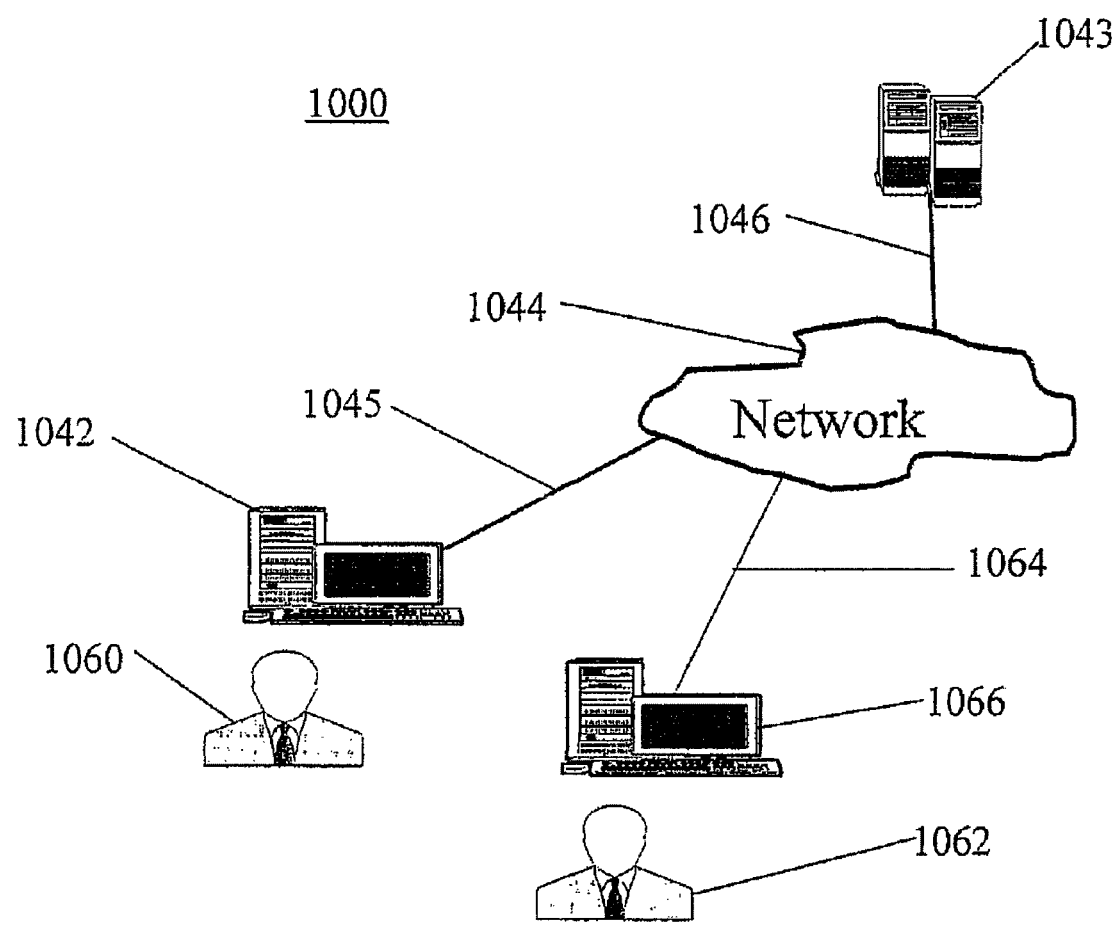
FIG. 8 is an illustration of multiple users interconnected to a server through a network of an embodiment.

FIG. 8 is a block diagram of various exemplary system components, in accordance with an aspect of the present invention. FIG. 8 shows a communication system 1000 usable in accordance with the present invention. The communication system 1000 includes one or more accessors 1060, 1062 (also referred to interchangeably herein as one or more "users") and one or more terminals 1042. 1066. In one aspect, data for use in accordance with the present invention is, for example, in and/or accessed by accessors 1060, 1064 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. In another aspect, the process and system of the present invention operate in a stand-alone environment, such as on a single terminal.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A method for automatic verification of free formatted variable text size page producing page certification of previous dynamic protection obtained by non experts in an office environment including a plurality of workers, printers, and materials, of full integrity against falsifications, content changes, unauthorized viewing, and distinguishing original from copy, of free formatted descriptive multi-page documents printed in regular paper, page by page and that set of pages verified are part of a single version of document, comprising:

receiving, at a remote expertise center, from a plurality of different digitally certified users (multi issuer), encrypted content to be included in a printed document, wherein the encrypted content is independent of predetermined formats of pages in the document;

selecting and processing, at the remote expertise center, a customized plurality of security features to be included on the printed document page the customized plurality of security features comprising a subset of available security features that are selected at least in part based on a selected printer model of the digitally certified user that is to be used to print the printed document;

encoding and encrypting content text of the encrypted content as part of a security bar to be included on the printed document page;

generating the customized plurality of security features including at least one remote graphic security feature and at least one electronic security feature, integrated to work as complementary and non-overlapping protection barriers, to be included on the printed document page, at least one of the security features representing the full content text that may include variable size text per page and at least one of the security features determined independently of the content text, wherein the security features enable the distinguishing of the original document printed page from copy of the document printed page, thereby providing document protection to different ages and technologies of copy equipment and scanning equipment, and the one or more security features usable to generate different alerts when the document page is a copy and not an original, independently of copier equipment used to copy documents;

generating, at the remote expertise center, digital signature for the document page to be printed at the location of the certified user;

transmitting, from the remote expertise center, a print command directly to the issuer selected printer model, using printer driver instructions of the selected specific printer model, assigned according to particular location of the digitally certified user, the print command bypassing an operational system of the digitally certified user, and the print command including the digital signature, content, and the plurality of security features tuned individually based on the selected printer in accordance with printer model specifications; and verifying the digital signature of the printed document page before or just after printing of the printed document page to detect and indicate at least one of any improper alteration or improper interception.

2. The method of claim 1, wherein said receiving comprises receiving a document at a server that is remote from a user that generated the document.

3. The method of claim 2, wherein the user and server are connected through the Internet.

4. The method of claim 1, wherein said generating comprises:

transforming an image of page text into characters;
encrypting the transformed text;
encoding the encrypted text into a specific computer readable code; and
generating a security feature including this specific computer readable code to be printed on the printed document page as part of the security bar corresponding exactly to the original text of the printed document page.

5. The method of claim 1, wherein said generating comprises:

generating a customer colored background image to be printed in the background of the content on the printed document page that disappears or loses intensity when copied;
generating a computer readable code representing the text to be printed the printed document page;
generating an identification area representing information related to the origin of the document page, including the author (certified user), location, date, and universal time information, associated with the document page to be printed and included as a portion of the security bar associated with the printed document page and readable only with a predetermined optical filter, and that fades or disappears when copied; and generating a copy alert as part of the security bar of the printed document page that changes appearance when the printed document is copied.

6. The method of claim 1, wherein said transmitting comprises:
determining the selected printer model that is to be used to print the document at the digitally certified user location;
verifying which certified printer model is assigned to the user and configured to receive the print command directly from the remote expertise center, selecting to apply a set of instructions for the specific printer model, the print command bypassing the user operational system to avoid interceptions and undue alterations before effective printing;
selecting at least one of the customized plurality of security features from a plurality of patterns based on the printer model;
formatting the content and plurality of security features based on the printer model; and
transmitting the content and security features, along with printer driver commands from the remote expertise center directly to the assigned printer.

7. The method of claim 1, further comprising:
receiving, at a remote server, a scanned image of the printed and previously protected document page;
decoding and decrypting a specific computer readable code representing the full original content printed on the printed document;
performing optical character recognition (OCR) on the document page to determine the visual text printed on the document page;
comparing the OCR converted text to the original decoded text, detecting and indicating in both text versions of page all of the alterations perpetrated;
transmitting a certification of the verified page, the certification including a result of an automatic verification of each past protected page with set of retrieved information about when, who and where the document printed page was protected, and what version of the document printed page has been verified, when verification was completed, and an identification of a user that requested verification, whether the page has been altered, and information on when and where a page was altered when it is determined the page has been altered, exhibiting both visible and original block versions of page text, remarking discrepancies in both; and
presenting a result of the automatic verification on a user computer screen, printing the result of each page and storing the result as read only data in a customer audit module for further internal verification.

8. The method of claim 7, wherein said transmitting all indications where the document page has been altered comprises transmitting images of both versions of same page: the full original document page text stored in the security bar and all visible text portions of the document page, remarking in each block version each detected discrepancy.

9. A method for protection of free formatted, variable text size, descriptive multi-page documents printed in paper obtained by non experts in an office environment including a plurality of workers, printers, and materials, comprising:
receiving, at a remote server, content to be included in a printed document page from a first user;
generating a plurality of security features to be included simultaneously with printing the document page, at least one of the security features representing content text and at least one of the security features determined independently of the content text, wherein the content text is located on the printed document page independently of a predefined format and size for content text, and the plurality of security features comprising a subset of available security features that are selected at least in part based on a selected printer of a plurality of different printers that is to be used to print the printed document, and wherein the security features include at least one graphic security feature and at least one electronic security feature;
transmitting a print command directly to an issuer selected printer model, using printer driver instructions of the selected specific printer model, assigned according to particular location of the second user, the print command bypassing an operational system of the second user, and the print command including the digital signature, content, and the plurality of security features tuned individually based on the selected printer in accordance with printer model specifications.

10. The method of claim 9, wherein the set of security features comprise:
a protection against falsification security feature that includes one or more printed objects that have a different appearance, or disappear, when copied;
an identification protection security feature that includes information related to the originator of the document page, date of creation, and universal time, the information in the identification protection security feature visible only through a predetermined optical lens;
a specific computer readable code that includes an encrypted and encoded version of the original text printed on the document page.

11. The method of claim 9, further comprising:
receiving a scanned image of the document page;
decoding and decrypting a specific computer readable code representing the original content that was printed on the printed document page;
performing optical character recognition (OCR) on the document protected page to determine the actual visible text printed on the protected document page;
comparing the OCR converted text to the decoded text; and
transmitting both page block versions remarking indications of which and where alterations occur in each page of the same page block versions of the document.

12. The method of claim 9, wherein said generating comprises:
identifying text in the document that is to be adapted based on the individual user to which the print command is transmitted;
changing the identified text to a substitute text;
storing the substitute text and the second user identification;
when an unauthorized copy of the document is identified, comparing the text of the unauthorized copy to the substitute text; and
identifying individual user as a source of a leak when the substitute text is in the unauthorized copy.

13. A method for verifying the complete integrity of a previously protected printed free formatted variable text size document page, comprising:
scanning a document page that includes a plurality of security features;
transmitting the image of the scanned document page to a remote server;
processing in the remote server an automatic verification that the document page integrity is preserved using only a page image converted into first and second blocks, the first block corresponding to the original page text encrypted and coded in a Security Bar, and the second block corresponding to visible text on the document page;
transmitting from the remote server to a digitally certified user computer screen and assigned printer the result of the automatic verification, and additionally transmitting the result to a different location for audit purposes;

transmitting from the remote server a print command directly to a selected printer model of the digitally certified user, using printer driver instructions of the selected specific printer model, assigned according to particular location of the digitally certified user, the print command bypassing an operational system of the digitally certified user, and receiving a result of the automatic verification including an indication of all adulterations in the document page as both block versions of the original protected page text and the visible scanned document page text.

14. The method of claim 13, wherein said transmitting is performed through the Internet.

15. A computer program product, comprising a non-transitory computer usable medium having a computer readable program code embodied therein, said computer readable program code adapted to be executed to implement a method for dynamic protection of documents printed in paper, said method comprising:

receiving, at a remote server, content to be included in a printed document page from a first user of a plurality of different digitally certified users;

generating a plurality of security features to be included simultaneously with printing the document page, at least one of the security features representing content text and at least one of the security features determined independently of the content text, wherein the content text is independent of predetermined formats of pages in the document, and the plurality of security features comprising a subset of available security features that are selected at least in part based on a selected printer that is to be used to print the printed document;

transmitting, from the remote server, a print command directly to the selected printer model of the second user, using printer driver instructions of the selected specific printer model, assigned according to particular location of the second user, the print command bypassing an operational system of the second user, and the print command including the digital signature, content, and the plurality of security features tuned individually based on the selected printer in accordance with printer model specifications.

16. The computer program product of claim 15, wherein said receiving comprises receiving a document page at a server that is remote from a user that generated the document page.

17. The computer program product of claim 16, wherein the user and server are connected through the Internet.

18. The computer program product of claim 15, wherein said generating comprises:

transforming an image of page text into characters;
encrypting the transformed text;
encoding the encrypted text into a specific computer readable code; and
using several different computer programs to generate each different security feature, including remote graphic and electronic security features, at least one of which including the specific computer readable code, including redundancy capacity of text retrieval, to be printed on the printed document page as part of the security bar corresponding exactly to the original text of the printed document page.

19. The computer program product of claim 15, wherein said non-transitory computer usable medium comprises a plurality of computer programs regarding each different security technology, and wherein said generating comprises:

generating a customer colored background image to be printed in the background of the content on the printed document page that disappears or loses intensity when copied;

generating a computer readable code representing the text to be printed the printed document page;

generating an identification area representing information related to the origin of the document page, including the author (certified user), location, date, and universal time information, associated with the document page to be printed and included as a portion of the security bar associated with the printed document page and readable only with a predetermined optical filter, and that fades or disappears when copied; and generating a copy alert as part of the security bar of the printed document page that changes appearance when the printed document is copied.

20. The computer program product of claim 15, wherein said transmitting comprises:

determining the selected printer that is to be used to print the document at the digitally certified user location;

verifying which certified printer model is assigned to the user and configured to receive a print command directly from the remote expertise center, selecting to apply a set of instructions for the specific printer model, the print command bypassing the user operational system to avoid interceptions and undue alterations before effective printing;

selecting at least one of the plurality of security features from a plurality of patterns based on the printer model;

formatting the content and plurality of remote graphic security features, integrated with electronic security features based on the printer model; and transmitting the content and security features, along with printer driver commands from the remote expertise center directly to the printer.

21. The computer program product of claim 15, said method further comprising:

receiving a scanned image of the document page;

decoding and decrypting a computer readable code representing the original content that was printed on the printed document page;

performing optical character recognition (OCR) on the document to convert actual visible image text of document protected page into the actual visible text printed page on the protected document page;

comparing the OCR text to the decoded text;

transmitting an indication that the document has not been altered when the comparing indicates no differences; and transmitting both page block versions remarking indications of which and where alterations occur in each version of the same page of the document.

* * * * *